(12) United States Patent
Mueller et al.

(10) Patent No.: US 8,291,253 B2
(45) Date of Patent: Oct. 16, 2012

(54) INTERFACE DEVICE, CIRCUIT MODULE, CIRCUIT SYSTEM, DEVICE FOR DATA COMMUNICATIONS AND METHOD FOR CALCULATING A CIRCUIT MODULE

(75) Inventors: Christian Mueller, Taufkirchen (DE); Maurizio Skerlj, Munich (DE)

(73) Assignee: Qimonda AG, Munich (DE)

( * ) Notice: Subject to any disclaimer, the term of this patent is extended or adjusted under 35 U.S.C. 154(b) by 787 days.

(21) Appl. No.: 12/040,356

(22) Filed: Feb. 29, 2008

(65) Prior Publication Data
US 2008/0215905 A1 Sep. 4, 2008

(30) Foreign Application Priority Data
Mar. 2, 2007 (DE) .................. 10 2007 010 284

(51) Int. Cl.
G06F 1/12 (2006.01)
G06F 13/42 (2006.01)
H04L 5/00 (2006.01)
H04L 7/00 (2006.01)

(52) U.S. Cl. .......... 713/400; 713/500; 713/503; 710/52; 710/58

(58) Field of Classification Search .................. 713/400, 713/500, 503; 710/52, 58
See application file for complete search history.

(56) References Cited

U.S. PATENT DOCUMENTS

| | | | |
|---|---|---|---|
| 6,298,465 B1 | 10/2001 | Klotchkov | |
| 6,820,234 B2 * | 11/2004 | Deas et al. | 714/814 |
| 7,062,597 B2 | 6/2006 | Perego et al. | |
| 7,079,446 B2 * | 7/2006 | Murtagh et al. | 365/189.05 |
| 7,095,661 B2 | 8/2006 | Osaka et al. | |
| 7,124,270 B2 | 10/2006 | Dillon et al. | |
| 7,275,173 B2 * | 9/2007 | Lindt | 713/500 |
| 7,320,047 B2 * | 1/2008 | Perego et al. | 711/5 |
| 7,421,558 B2 * | 9/2008 | Choi et al. | 711/167 |
| 7,467,317 B2 * | 12/2008 | Matsui | 713/401 |
| 2002/0095613 A1 * | 7/2002 | Matsuoka et al. | 713/400 |
| 2003/0028691 A1 | 2/2003 | Burkes et al. | |
| 2006/0095646 A1 | 5/2006 | Gower et al. | |
| 2006/0195631 A1 | 8/2006 | Rajamani | |
| 2007/0070669 A1 * | 3/2007 | Tsern | 365/51 |
| 2007/0153590 A1 * | 7/2007 | Seo et al. | 365/189.09 |
| 2007/0195613 A1 * | 8/2007 | Rajan et al. | 365/189.05 |
| 2008/0025123 A1 * | 1/2008 | Rajan et al. | 365/227 |

FOREIGN PATENT DOCUMENTS

| | | |
|---|---|---|
| DE | 102 34 675 A 1 | 2/2003 |
| DE | 699 05 750 T2 | 2/2004 |

* cited by examiner

*Primary Examiner* — Jaweed A Abbaszadeh
(74) *Attorney, Agent, or Firm* — John S. Economou

(57) ABSTRACT

An interface device allows data communication between a controller and a plurality of circuit units. The interface device has a first interface for a connection to the controller, a second interface for a connection to a second circuit unit, and a third interface for a connection to a second circuit unit. An interface calibrating unit is coupled to the second and third interfaces and a non-volatile calibrating parameter memory is arranged in the interface calibrating unit or coupled to the calibrating unit. The memory is adapted to store calibrating parameters for the second and third interfaces.

21 Claims, 5 Drawing Sheets

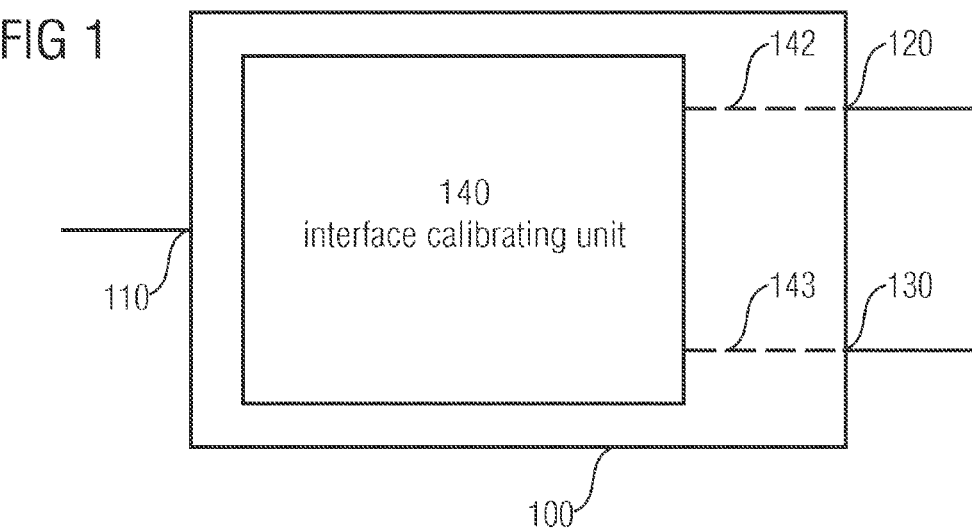
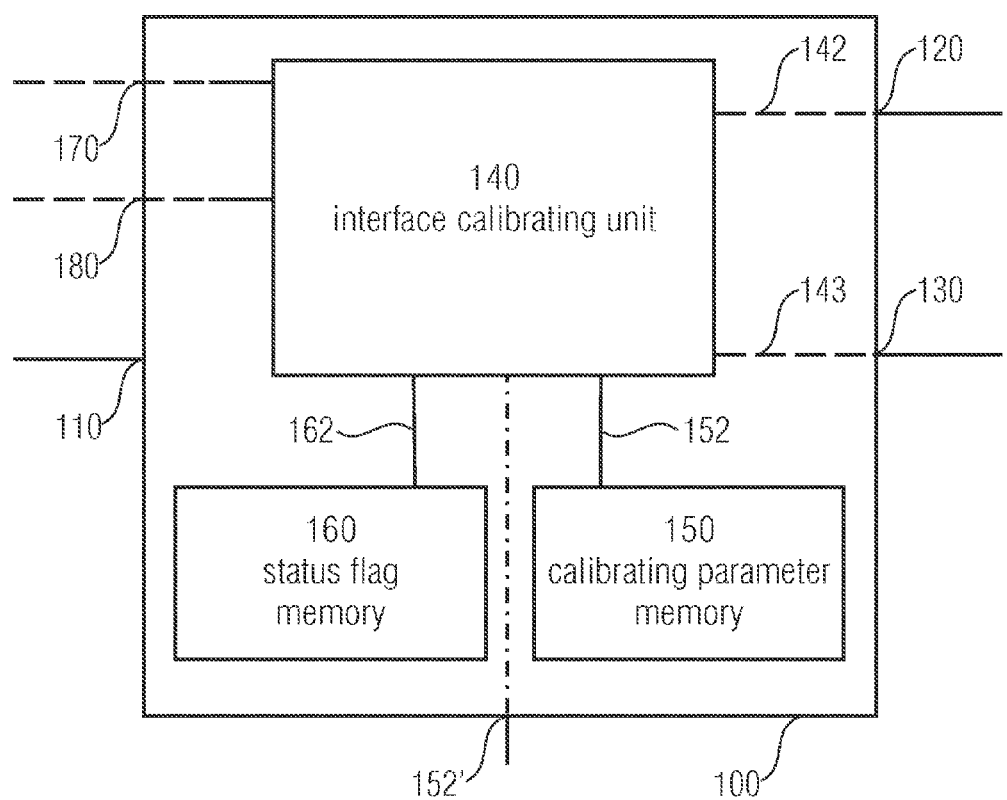

INTERFACE DEVICE, CIRCUIT MODULE, CIRCUIT SYSTEM, DEVICE FOR DATA COMMUNICATIONS AND METHOD FOR CALCULATING A CIRCUIT MODULE

This application claims priority from German Patent Application No. 10 2007 010 284.6, which was filed on Mar. 2, 2007, and is incorporated herein by reference in its entirety.

TECHNICAL FIELD

The present invention relates to interfaces for data communications and, in particular, to calibrating interfaces.

BACKGROUND

The requirements to the data transmission speed of systems are increasing continuously. In digital systems, the timing of, for example, reading and writing operations between the individual components of a data transmission system and the bus systems connecting these among one another or, generally, transmission paths is increasing in importance for taking over and/or passing on the data correctly. This mutual tuning of the components and/or the interfaces for data transmission is also referred to as calibrating.

In conventional memory systems, for example, a memory controller typically communicates with a plurality of memory components, like for example, DRAM (dynamic random access memory) components. The memory controller and the memory components here are connected to one another via a common bus system such that the memory controller communicates directly with each memory component.

In conventional memory systems, the memory controller calibrates the interface to the individual memory components. The data transfer requirements of the interface, however, only allow a certain number of data lines. This restricts the number of memory components which can be linked to the data bus. Using a buffer chip between the memory controller on the one hand and a plurality of memory components on the other hand may increase the data transmission rate between the memory controller and individual memory components. However, the result is that the memory controller will only calibrate the interface between the memory controller and the buffer chip, whereas the interfaces between the buffer chip and the individual memory components remain uncalibrated since the buffer chip acts in a manner transparent for the memory controller and thus no time slot is provided in the standardized protocol and/or the interface in which the buffer chip may calibrate the interfaces to the memory components.

However, calibration of, if possible, all interfaces is desirable to achieve correct data transmission at high a data transmission rate.

BRIEF DESCRIPTION OF THE DRAWINGS

Embodiments of the present invention will be detailed subsequently referring to the appended drawings.

FIG. 1 shows a block circuit diagram of an embodiment of an interface device comprising an interface calibrating unit;

FIG. 2 shows a block circuit diagram of another embodiment of an interface device comprising an interface calibrating unit, a calibrating parameter memory and a status flag memory;

DETAILED DESCRIPTION OF ILLUSTRATIVE EMBODIMENTS

Figure 3:
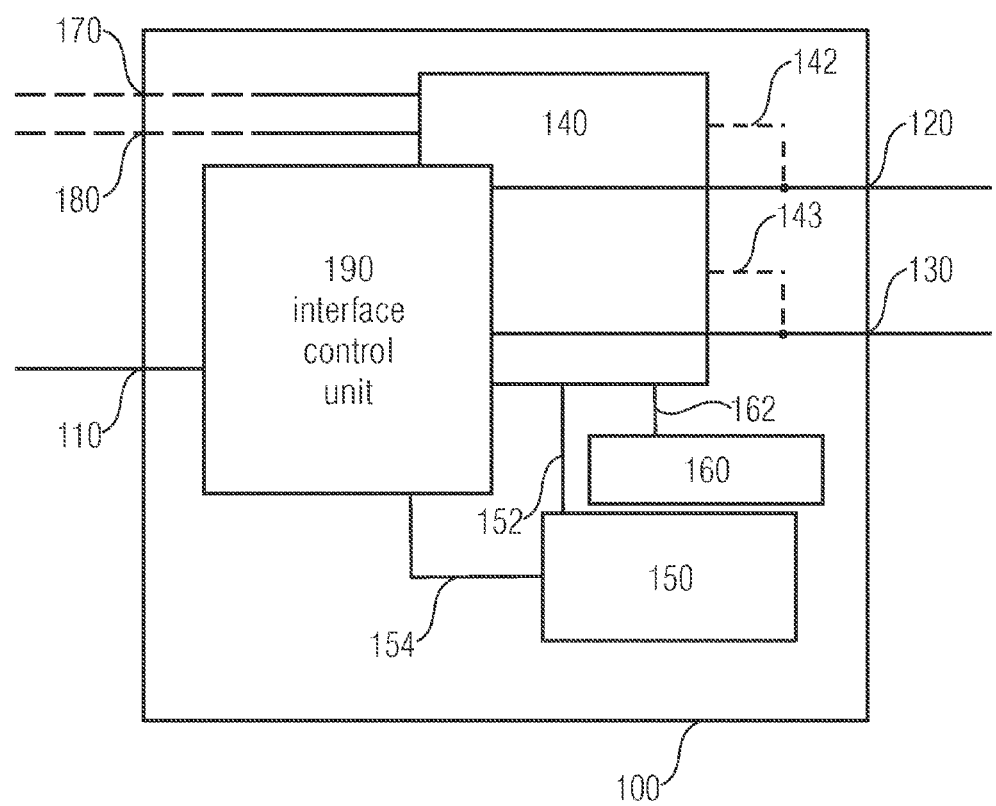
FIG. 3 shows a block circuit diagram of another embodiment of an interface device comprising an interface controller and an interface calibrating unit.

In embodiments of the present application, same reference numerals will be used for objects and functional units comprising same or similar functional characteristics. In this context, it is pointed out that, on the one hand, unless explicitly indicated otherwise, portions referring to objects having similar or same functional characteristics are exchangeable between the descriptions of different embodiments. On the other hand, it is pointed out that when using a common reference numeral for an object present in more than one embodiment, this does not imply that these comprise identical features and characteristics in the different embodiments or the respective embodiment. Common or similar reference numerals thus make no statement as to the specific design and dimensioning.

An embodiment of the present invention provides an interface device allowing data communication between a controller and plurality of circuit units, comprising: a first interface for a connection to the controller; a second interface for a connection to the first control unit; a third interface for a connection to a second control unit; an interface calibrating unit coupled to the second and third interfaces; and a non-volatile calibrating parameter memory which is arranged in the interface calibrating unit or coupled to the calibrating unit and adapted to store calibrating parameters for the second and third interfaces.

Another embodiment of the present invention provides a circuit module for data communication with a controller, the circuit module comprising: a first and second circuit units; and an interface device comprising a first interface for a connection to the controller; a second interface connected to the first circuit unit; a third interface connected to the second circuit unit; and an interface calibrating unit coupled to the second and third interfaces; and a non-volatile calibrating parameter memory coupled to the interface calibrating unit and adapted to store calibrating parameters for the second and third interfaces.

Another embodiment of the present invention provides a circuit system comprising: a circuit controller; and a circuit module comprising a first and second circuit units; and an interface device comprising a first interface for a connection to the circuit controller; a second interface connected to the first circuit unit; a third interface connected to the second circuit unit; and an interface calibrating unit coupled to the second and third interfaces; and a non-volatile calibrating parameter memory which is coupled to the interface calibrating unit and adapted to store calibrating parameters for the second and third interfaces.

An additional embodiment provides a device for data communication between a device for controlling and a plurality of means for data handling, comprising: first means for communicating data with the device for controlling; second means for communicating data with first means for data handling; third means for communicating data with second means for data handling; and means for performing a calibrating algorithm generating calibrating parameters for the second and third interfaces; and means for storing the calibrating parameters in a non-volatile manner, the means for performing a calibrating algorithm being implemented to store the calibrating parameters generated by the calibrating algorithm in the means for storing.

In addition, an embodiment of the present invention provides a method for calibrating a circuit module for data communication with a circuit controller, comprising: providing the circuit module comprising a first and second circuit units and an interface device, the interface device comprising a first interface for a connection to the controller, a second interface connected to the first circuit unit, and a third interface connected to the second circuit unit; and performing a calibrating algorithm to generate calibrating parameters for the second and third interfaces; and storing the calibrating parameters generated in a non-volatile manner.

In embodiments of the present invention, the second and third interfaces for a connection between the interface device and the first and second circuit units, respectively, may be calibrated without having to adjust or alter the first interface.

Embodiments of the present invention can be employed with conventional controllers and/or circuit units and/or standardized interfaces for communication between a controller and a plurality of circuit units.

Embodiments of a circuit module can be calibrated separate from the target system, i.e., the circuit system including the controller, i.e., embodiments of the circuit module can be pre-calibrated.

FIG. 1 shows an embodiment of an interface device 100 comprising a first interface 110 for a connection to a controller, a second interface 120 for a connection to a first circuit unit, a third interface 130 for a connection to a second circuit unit, and an interface calibrating unit 140 coupled to the second and third interfaces, as is indicated by broken lines. The interface calibrating unit 140 is implemented to perform a calibrating algorithm generating calibrating parameters for the second and third interfaces.

Thus, the interface calibrating unit 140 may be implemented to determine each interface, i.e., the second interface 120 and the third interface 130, separately by performing a first calibrating algorithm for generating the calibrating parameters of the second interface 120 and performing a second calibrating algorithm for generating the calibrating parameters of the third interface 130 or performing the same calibrating algorithm twice, but separately for both interfaces, performing the respective calibrating algorithms one after the other or simultaneously and/or in parallel but offset in time.

Apart from the second and third interfaces, embodiments may additionally comprise further interfaces, like for example interfaces to other circuit units.

We generally speak of an interface when two apparatuses or units are connected to each other for signal transmission. An interface and/or connection is typically defined by its physical characteristics and the corresponding interface protocol for the data and control signal transmission between the two units.

An interface may be standardized. Standardization and/or standardized interface in this document means that the interface is realized according to a standard of, for example, a standardization organization, that the interface is realized according to a specification arranged between manufacturers and/or that the interface is a custom-made interface for a product or a product family which is not to be altered. The target of standardizing interfaces is that different units and, in particular, units of different manufacturers are able to communicate via a common uniform interface.

The calibrating algorithm exemplarily contains generating a defined sequence of signals and measuring, for example, runtimes to determine the calibrating parameters.

The functions of the individual elements and/or the cooperation thereof will be discussed in greater detail below referring to FIG. 4.

FIG. 2 shows a block circuit diagram of another embodiment of the interface device which in addition to the embodiment according to FIG. 1 comprises a calibrating parameter memory 150, a status flag memory 160, a current supply interface 170 and an optional enabling interface 180. The calibrating parameter memory 150 is coupled to the interface calibrating unit 140 via the calibrating parameter memory interface 152, the status flag memory 160 is coupled to the interface calibrating unit 140 via the status flag memory interface 162.

Alternatively, the calibrating parameter memory interface 152 and/or the status flag memory 160 may be integrated in the interface calibrating unit 140.

In further alternative embodiments, the interface device 100 does not comprise a calibrating parameter memory 150, but a fourth interface and/or calibrating parameter memory interface 152' so that the calibrating parameters can be stored externally.

The interface calibrating unit 140 is supplied with current via the current supply interface and/or the current supply input 170 of the interface device (see broken line). In addition, the interface calibrating unit 140 is coupled to an enabling interface 180 of the interface device (see broken line).

FIG. 3 shows a block circuit diagram of another embodiment which compared to the embodiment according to FIG. 2 comprises and/or exhibits an interface control unit 190, the interface control unit 190 being implemented to connect the first interface 110 to the second and third interfaces 120 and 130 for data communications between the controller which is coupled to the interface device 100 via the interface 110 and the two circuit units which are coupled to the interface device via the second and third interfaces 120 and 130, respectively, to allow data transmission between the controller and circuit components (see continuous lines between the interfaces 110, 120 and 130 and the interface control unit 190). Data communication generally includes transmitting useful data and transmitting control signals for the data communications. Performing the calibrating algorithm by means of the interface calibrating unit 140 serves for calibrating the second and third interfaces 120, 130 for data communications between the controller and the circuit units.

In the embodiment shown in FIG. 3, the interface calibrating unit 140, relative to the second and third interfaces 120, 130, is connected in parallel to the interface control unit 190, as is illustrated by the broken lines 142 and 143.

The interface control unit 190 is additionally coupled to the calibrating parameter memory 150 via the interface 154.

The interface control unit is coupled to the calibrating parameter memory 150 via a second calibrating parameter memory interface 154.

In another embodiment, the calibrating parameter memory 150 and the status flag memory 160 are integrated in a physical storage which in turn may be integrated in the interface calibrating unit 140 and/or the interface control unit 190.

In an alternative embodiment, the interface calibrating unit 140 and the interface control unit 190 are integrated in a single unit which is implemented to exemplarily execute the calibration and/or calibrating algorithm in a calibrating mode and to perform controlling the communication via the first, second or third interface 110, 120, 130 in a data communication mode.

The interface control unit 190, the calibrating unit 140 and/or a corresponding unit integrating both functions 140, 190 may exemplarily be a process unit controlled by a program which executes the functions of the interface calibrating unit according to a calibrating program and executes the functionalities of the interface control unit 190 according to an interface control program.

Thus, in further embodiments, the interface 110 is a standardized interface for direct data communication between the controller and the circuit units and the interface device 100 is transparent for the controller, i.e., the controller, on the interface protocol level and/or logical level, is not aware of the fact that the interface device 100 is physically connected between the controller and the circuit units.

Figure 4:
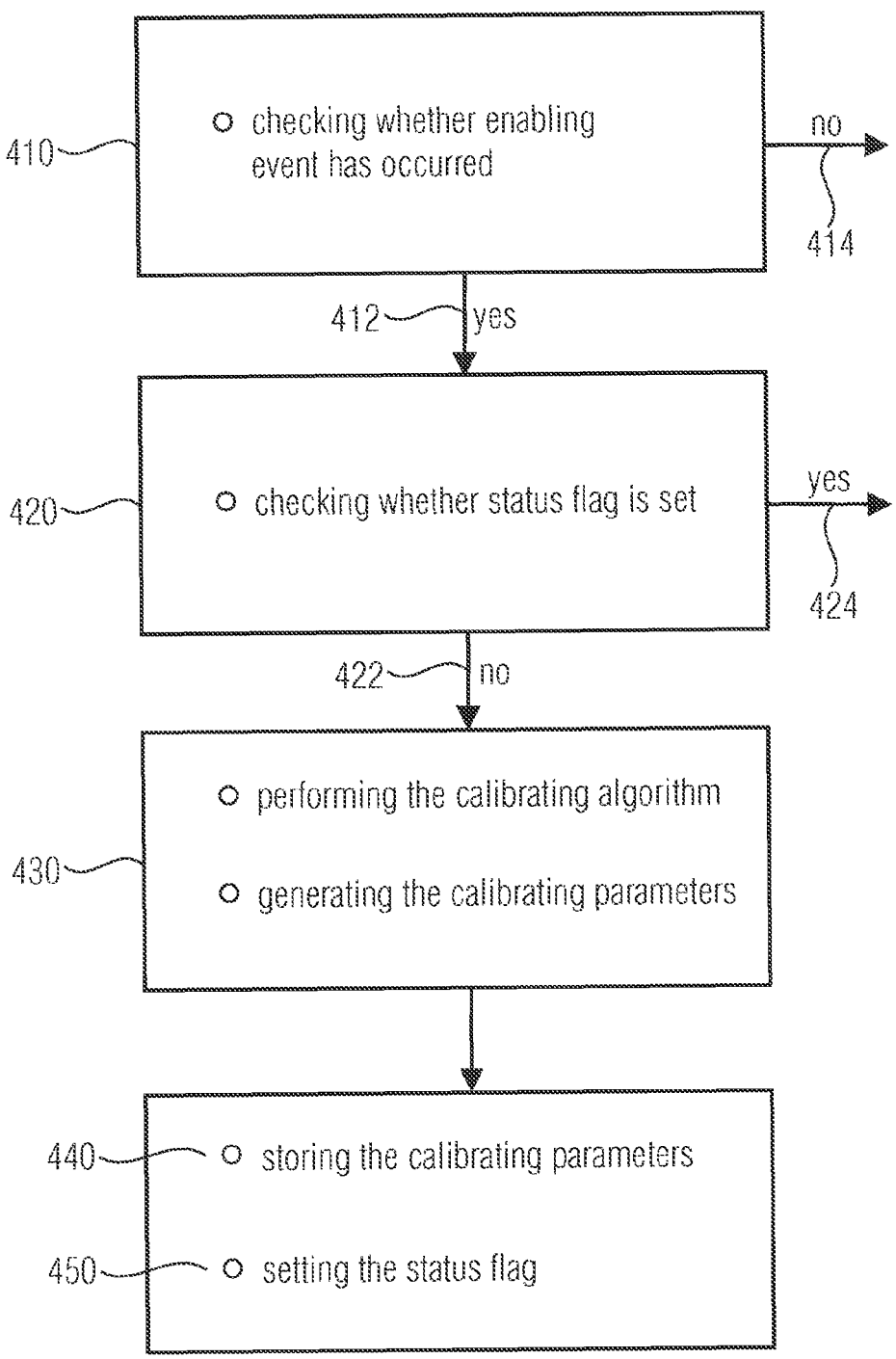
FIG. 4 shows a flow chart of an embodiment for calibrating an interface device.

FIG. 4 shows a flow chart of an embodiment of performing calibration of the second and third interfaces according to FIGS. 1 to 3.

In step 410, checking whether an enabling event has occurred is performed. An enabling event may exemplarily be enabling and/or switching on the interface device. In particular, this may be first enabling the interface device after manufacturing thereof, exemplarily in a production test environment or generally test environment. In these cases, we also speak of self-initiated enabling. In another example, the enabling event may also take place by an external enabling signal which is exemplarily received via the enabling interface 180 as illustrated in FIGS. 2 and 3.

When no enabling event has occurred, see arrow 414, the method is interrupted here and the calibrating algorithm will not be performed.

When an enabling event has occurred, see arrow 412, checking whether the status flag is set is performed in step 420 in the embodiment illustrated in FIG. 4. If the status flag is set, see arrow 424, the method is interrupted and no calibrating algorithm will be performed. A set status flag in this case means that no calibration is to be performed, for example, because calibration has already been performed and corresponding calibrating parameters are already there and/or have already been stored.

If the status flag is not set, see arrow 422, the calibrating algorithm will be performed next, see step 430. Using the calibrating algorithm, the calibrating parameters necessary for the second and third interfaces are generated.

In step 440, the calibrating parameters for the second and third interfaces are stored.

In step 450, the status flag is set to indicate that the calibrating parameters have been generated and stored.

Step 430 of performing the calibrating algorithm and generating the calibrating parameters (step 430) for the second and third interfaces is essential, whereas the steps "checking whether an enabling event has occurred" (step 410) and/or the step "checking whether the status flag is set" (step 420) are optional.

In alternative embodiments, the steps may also be performed in a different order and/or simultaneously. Thus, step 420 may exemplarily be performed before step 430 or simultaneously, and step 430 and step 440 may be performed simultaneously, for example, by storing individual calibrating parameters even before the calibrating algorithm is completed.

In one embodiment, the status flag can only be set once and will then remain set, i.e., the status flag is stored by means of, for example, read-only memories (ROMs), flash memories or fuse-based memories (fuses).

In another embodiment, the calibrating parameters can only be stored once, i.e., the calibrating parameters are stored by means of, for example, read-only memories (ROMs), flash memories or fuse-based memories (fuses). In certain embodiments, the calibrating parameters can additionally no longer be altered.

The calibrating parameters and/or the status flag may thus be generated and stored once, exemplarily after manufacturing the circuit module which comprises the interface calibrating unit and the two or more circuit units, and exemplarily be kept without losing calibrating parameters and/or status flag information. In other words, the circuit module remains pre-calibrated.

Setting the status flag may mean that the status flag takes the logic value of "1", and resetting that the status flag takes the logical value of "0". The statuses "set" and "not set", however, may also be associated to any other different values.

Subsequently, embodiments having been described referring to FIGS. 1 to 3 will be discussed in greater detail in connection with the embodiments of the method described referring to FIG. 4 and/or the functionalities thereof.

Consequently, FIG. 1 shows an embodiment in which the interface calibrating unit 140 is implemented to perform the calibrating algorithm and generate the calibrating parameters (see step 430).

FIG. 2, in connection with FIG. 4, describes an embodiment in which exemplarily the interface calibrating unit 140 is implemented to check whether an enabling event has occurred. This enabling event may, as explained before, be applying a supply voltage via the current supply input 170, wherein in this case applying the current supply may also be seen as a type of enabling signal or be receiving an enabling signal via the enabling interface 180.

The interface calibrating unit 140 in FIG. 2 is further implemented to exemplarily check via the status flag interface 162 whether the status flag stored in the status flag memory 160 is set or not. If the status flag is not set, the interface calibrating unit 140 will be implemented to perform the calibrating algorithm to generate the calibrating parameters for the second and third interfaces 120, 130. Additionally, the interface calibrating unit 140 is implemented to store the calibrating parameters generated for the second and third interfaces in the calibrating parameter memory 150, for example, via the calibrating parameter memory interface 152.

As is illustrated in FIG. 3, the calibrating parameters generated which are stored in the calibrating parameter memory 150 may then be made available to the interface control unit 190 via the second calibrating parameter memory interface 154 to calibrate and/or adjust correspondingly the data transmission via the first, second and/or third interfaces 110, 120, 130. In further embodiments, adjusting for data transmission may also take place by the calibrating unit.

Subsequently, an embodiment from the field of memory technology will be discussed in greater detail, without limiting the invention or embodiments of the invention to this application.

Figure 5:
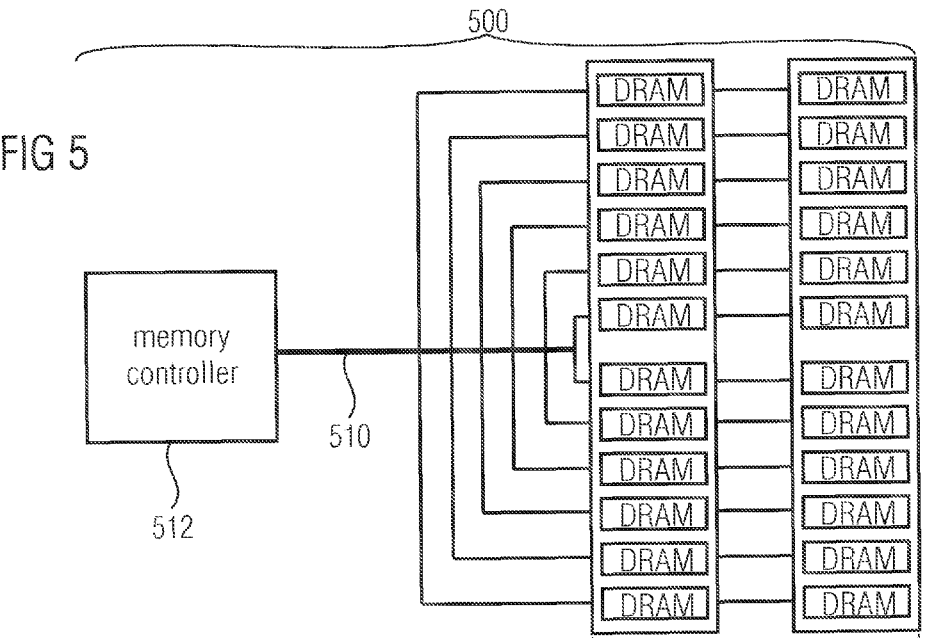
FIG. 5 shows a block circuit diagram of a conventional memory system comprising a memory controller and a plurality of memory modules.

FIG. 5 shows a block circuit diagram of a conventional memory system 500 comprising DRAM memory components, which is connected, via a standard interface 510 to a memory controller 512 and to a plurality of DRAM memory components 502. In systems of this kind, the memory controller calibrates the interface to the DRAM components of an "unbuffered" and "registered" DIMM (dual inline memory module) for every DRAM component. "Unbuffered" here means that the memory controller and the memory components are connected directly, i.e. no buffer chip is connected between. "Registered" means that the command bus and address bus (CA bus—command and address bus) are buffered on the "registered DIMM", however the data lines are still connected directly to the controller. Since the signals at the CA bus are re-synchronized (by the register element on the DIMM), this element can, on a very abstract level, be considered as a simple register, thus the respective designation.

The speed and/or data transmission rate requirements of this kind of interface, however, only allow a certain maximum utilization of the data lines so that the number of components which may be linked to the data bus is limited. The memory interface 510 where the memory controller has a defined electrical interface and a corresponding protocol relative to the memory components is trained and calibrated during system startup.

Figure 6:
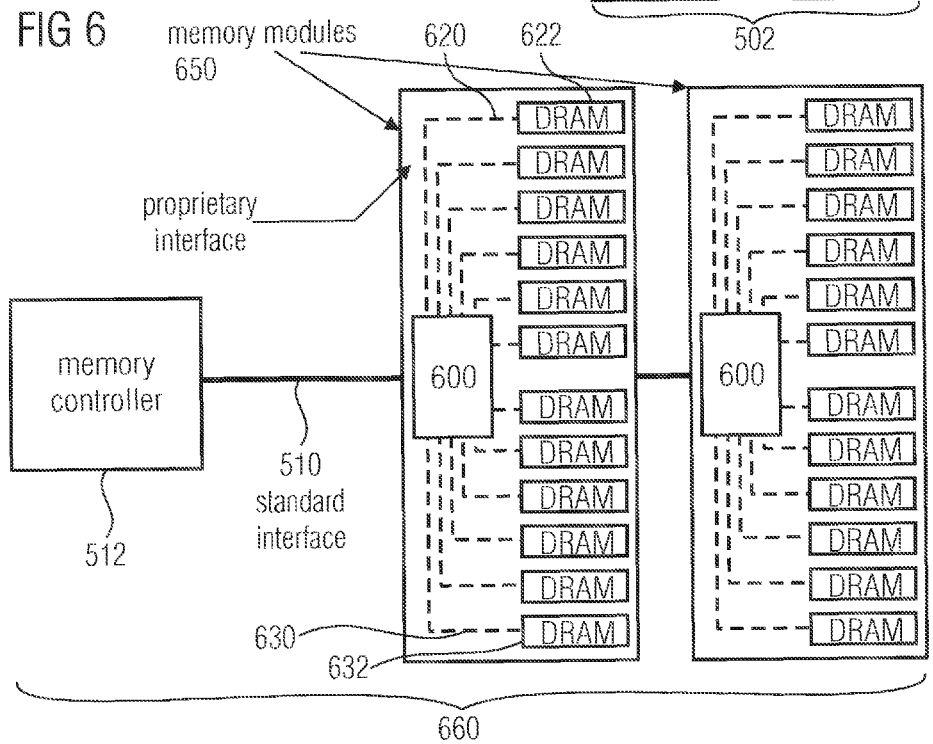
FIG. 6 shows a block circuit diagram of an embodiment of a memory module and/or memory system comprising an interface device.

FIG. 6 shows a block circuit diagram comprising embodiments of different designs where a buffer chip and/or the interface device 600 may be formed, for example, in accordance with the embodiments described with regard to FIGS. 1 to 3, and where interfaces 620, 630 connect the interface device 600 to the memory components 622, 632. The interfaces 620, 630 may be proprietary, however, may also be standard interfaces, like for example DRAM interfaces standardized according to JEDEC.

FIG. 6 thus shows an embodiment of an interface device 600 as a buffer chip 600, an embodiment of a circuit module 650 as a memory module 650 and an embodiment of a circuit system 660 as a memory system 660.

The memory system 660 according to FIG. 6 here includes a memory controller 512 as a controller 512 which is connected to the buffer chip 600 via a standard interface 510 and connected to one or several memory modules 650 via this chip.

Figure 7:
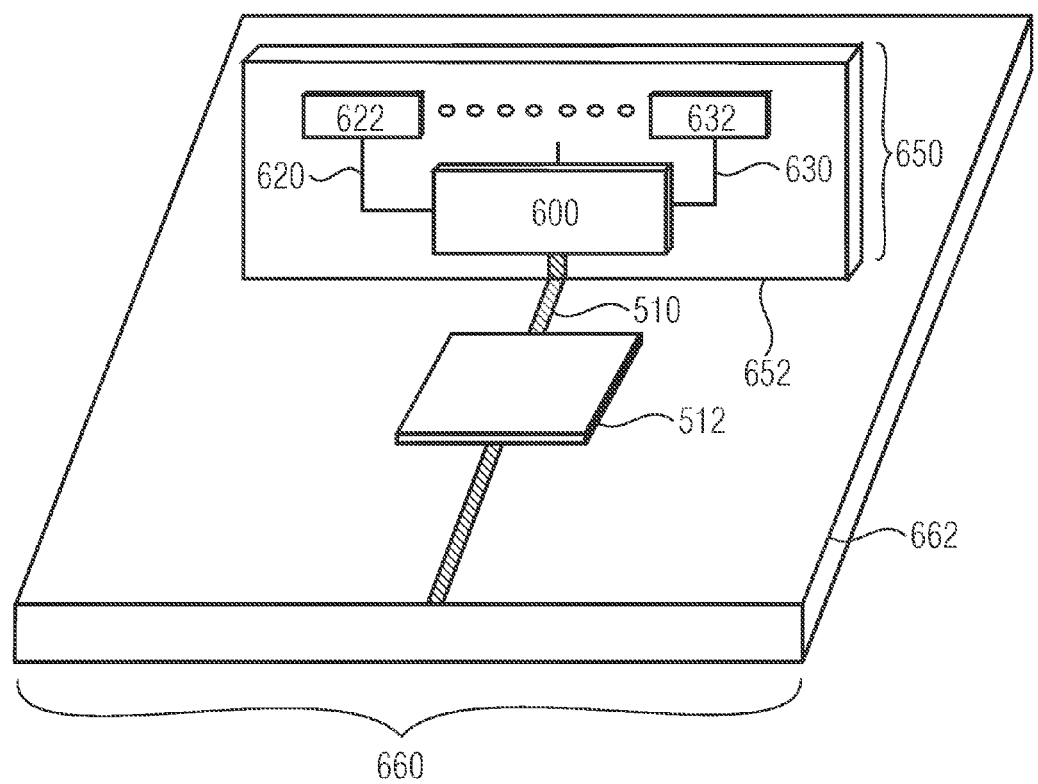
FIG. 7 shows a perspective representation of an embodiment of a memory system where a memory module is implemented on a memory module board and this memory module is applied onto a motherboard.

FIG. 7 shows a perspective representation of an embodiment of a memory system which corresponds to that "functionally" illustrated in FIG. 6. The memory module 650 comprises a memory module board 652 on which the functional components of the memory module, the interface device 600 and the memory components 622, 632 are arranged. The memory controller 510 in FIG. 7 is arranged on a motherboard 662. The memory module may, as described before, exemplarily be a DIMM which is then exemplarily plugged onto the motherboard, whereas the memory components of the memory module are individual memory chips 622, 632 and the interface device is a buffer chip 600.

In alternative embodiments, functional components of the memory module and the memory controller may be mounted on one and the same board.

A memory module 650 according to FIG. 6 or 7 comprises an interface device 600 which may exemplarily be implemented in accordance with the embodiments in FIGS. 1 to 3 and comprises a plurality of memory components and/or memory chips of which two are exemplarily characterized by the reference numerals 622 and 632. The interface device 600 is connected to the memory modules 622 and 632 via interfaces 620 and 630, respectively. Thus, the interface 620 corresponds to the second interface 120, the memory components 622 corresponds to the first circuit unit, the interface 630 corresponds to the third interface 130 and the memory component 632 corresponds to the second circuit unit. The interfaces 620, 630 may be proprietary, however may also be standard interfaces, like, for example, DRAM interfaces standardized according to JEDEC.

As discussed before, interconnecting a buffer chip which only generates a small load on the interface side 510 to the memory controller and connecting several memory components to the buffer chip on the other side 622, 632 (buffering) can reduce the utilization problem significantly. This is also referred to as "buffering".

However, training and calibrating by the memory controller will only work up to the interface device and/or the buffer chip, since the interface device is logically transparent for the memory controller, but electrically connected between the memory controller and the memory components.

Thus, calibrating will only be performed for the interface between the memory controller and the interface device. The other interface between the interface device and the memory components remains uncalibrated. The standards and/or standardized protocols of the standard interface 510 do not allow the interface device 600 to perform a special calibration, since calibrating destroys the contents of the memory, since a typical calibrating algorithm performs a certain sequence of reading and writing accesses which otherwise do not differ from normal reading and writing accesses.

In a typical memory circuit, the memory controller regulates selecting and/or addressing the memory chips and the memory regions which are to be accessed by reading and writing accesses, and performing the reading and writing operations. Additionally, the memory controller, in DRAM memory chips, also controls refresh of the memory cells. Conventional standard interfaces 510 have been optimized to optimizing the data transmission rate but at the same time also ensuring refreshing the data cell contents in time. The result here is that the memory controller communicates permanently with one or several memory chips so that no time interval remains for an interconnected transparent interface device where the interface device could calibrate its interfaces to the memory chips without altering the standard interface.

Since component variations and variations and/or mismatches of the data path between the interface device and the memory components affect the interface rate achievable, it is desirable to allow calibrating the interfaces between the buffer chip 600 and the memory components 620, 630 to achieve the desired data transmission rates.

The subsystem and/or memory module 650 (exemplarily a DRAM) may exemplarily be calibrated during the production test, the calibration data and/or calibrating parameters being stored in a non-volatile memory. The non-volatile memory may either be an external memory component which is coupled to the interface device via the interface 152' (like, for example, a flash memory), or be integrated in the buffer chip and/or the interface device 600, as has been described using FIGS. 1 to 3 with regard to the calibrating parameter memory 150. For the integrated memory solution, embedded flash memories or fuse-based memories (fuses) may exemplarily be used.

When the entire subsystem and/or the entire memory module 650 is supplied with a current in the test environment for the first time, the buffer chip and/or interface device may be implemented to start a calibrating algorithm itself to train the interface to the memory components linked thereto. The beginning of the calibration may either be triggered and/or initiated by the buffer chips itself or by an external apparatus, like, for example, test devices. In self-initiated calibration, the interface device may exemplarily be implemented to read a status flag when switching on which indicates that no calibration has been performed in the past and/or whether calibration has been performed. In external initialization, executing the calibrating algorithm may be initiated by the external test device by exemplarily writing to a register of the interface device.

After having performed the calibrating algorithm successfully, the interface device writes the results, like, for example, the internal time parameters (time delay) to the non-volatile memory mentioned before and sets the status flag to indicate that calibration has been performed. Setting the status flag will prevent the interface device from executing the calibrating routine in the future due to self-initialization, for example when the memory module is integrated in the final memory system. Executing the calibration within the final memory system is not possible, since the interface device and/or buffer chip operates in a logically transparent manner and there is no period of time in the final memory system to read from the memory modules and/or write to same without interacting with the memory controller 510.

The calibrated subsystem and/or memory module 650 is then integrated into the main system and/or the memory system 660. The memory controller 510 calibrates its interface to the interface device 600 at every system startup, wherein the proprietary interfaces 620, 630 of the memory module have already been configured and/or calibrated by the information stored in the non-volatile memory, or in other words pre-calibrated.

Alternative embodiments may be implemented to, with integration in a memory system and/or linking to the memory controller 510, decouple the interface 510 from the interfaces 622, 632, perform the calibration and only then switch to a transparent operating mode, i.e., pass on control over the memory components 622, 632 to the memory controller 510. This will, for reasons mentioned before, only be possible at a time when the memory module is linked to the memory controller.

Further alternative embodiments may be implemented to perform the calibrating algorithm in a self-initiated way before or during linking to a memory controller, once or with every new linking to a memory controller, with or without checking the status flag. In particular, renewed calibration may be practical when a memory module, like for example a DIMM, is removed from a motherboard and plugged again onto the same or a different motherboard, to take for example aging effects into consideration.

Generally, embodiments of the interface calibrating unit may be implemented to execute calibration independently, i.e., in particular without executing a command of the memory controller. Thus, the enabling event, as discussed before, may exemplarily be first enabling the interface device after manufacturing thereof and/or after first connecting the interface calibrating unit to the circuit units.

It is pointed out that embodiments of the present invention are not limited to memory modules and/or memory systems, but that embodiments of the inventive interface device may be employed in every calibrated subsystem.

Further embodiments of the invention include a pre-calibrated complex and proprietary subsystem which, to the system, appears as a well-defined standard system and/or a system corresponding to the standard by hiding the proprietary extensions from same and/or by the fact that they are not visible for the system and/or transparent.

Embodiments of the present invention may include an extended subsystem including standard and non-standard components which are trained and calibrated within the subsystem. The subsystem has a defined interface to the memory controller, having the appearance of a standard memory component.

Depending on the circumstances, the embodiments of the inventive method may be implemented in either hardware or software. The implementation may be on digital storage medium, in particular on a disc, CD or DVD having control signals which may be read out electronically which can cooperate with a programmable computer system such that one of the embodiments of the inventive methods will be executed. Generally, the embodiments of the present invention are also in software program products and/or computer program products and/or program products having a program code stored on a machine-readable carrier for performing one of the embodiments of the inventive methods when one of the software program products runs on a computer or processor. In other words, an embodiment of the present invention may thus also be realized as a computer program and/or software program and/or program having a program code for performing an embodiment of an inventive method when the program runs on a processor.

The processor here may be a formed by a computer, a chip card, a digital signal processor or any other integrated circuit.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An interface device allowing data communication between a controller and a plurality of circuit units, the interface device comprising:
    a first interface for a connection to the controller;
    a second interface for a connection to a first circuit unit;
    a third interface for a connection to a second circuit unit;
    an interface calibrating unit coupled to the second and third interfaces for generating calibrating parameters for the second and third interfaces; and
    a non-volatile calibrating parameter memory arranged in the interface calibrating unit or coupled to the interface calibrating unit and adapted to store the calibrating parameters for the second and third interfaces.

2. The interface device of claim 1, wherein the non-volatile memory is adapted such that the calibrating parameters are no longer modifiable after storing them once.

3. The interface device of claim 1, further comprising a non-volatile status flag memory arranged in the interface calibrating unit or coupled to the interface calibrating unit.

4. The interface device of claim 3, wherein the calibrating unit comprises an enabling interface.

5. The interface device of claim 1, wherein the controller comprises a memory controller and the first and second circuit units comprise first and second memory components.

6. A circuit module for data communication with a controller, the circuit module comprising:
    first and second circuit units; and
    an interface device comprising:
        a first interface for a connection to the controller;
        a second interface connected to the first circuit unit;
        a third interface connected to the second circuit unit;
        an interface calibrating unit coupled to the second and third interfaces for generating calibrating parameters for the second and third interfaces; and a non-volatile calibrating parameter memory coupled to the interface calibrating unit and adapted to store the calibrating parameters for the second and third interfaces.

7. The circuit module of claim 6, wherein the interface device comprises the calibrating parameter memory.

8. The circuit module of claim 6, further comprising a non-volatile status flag memory coupled to the interface calibrating unit.

9. The circuit module of claim 6, wherein the circuit units comprise memory chips, the circuit module comprises a board onto which the interface device and the memory chips are applied, and the controller comprises a memory controller.

10. A circuit system comprising:
a circuit controller; and
a circuit module comprising:
first and second circuit units; and
an interface device comprising:
a first interface for a connection to the circuit controller;
a second interface connected to the first circuit unit;
a third interface connected to the second circuit unit;
an interface calibrating unit coupled to the second and third interfaces for generating calibrating parameters for the second and third interfaces; and
a non-volatile calibrating parameter memory coupled to the interface calibrating unit and adapted to store the calibrating parameters for the second and third interfaces.

11. The circuit system of claim 10, further comprising a non-volatile status flag memory coupled to the interface calibrating unit.

12. A device for data communication between a device for controlling and a plurality of means for data handling, the device comprising:
first means for communicating data with the device for controlling;
second means for communicating data with first means for data handling;
third means for communicating data with second means for data handling;
means for performing a calibrating algorithm which generates calibrating parameters for second and third interfaces; and
means for storing the calibrating parameters in a non-volatile manner, the means for performing a calibrating algorithm being implemented to store the calibrating parameters generated by the calibrating algorithm in the means for storing.

13. The device of claim 12, further comprising means for storing a status flag in a non-volatile manner, wherein the unit for performing the calibrating algorithm is implemented to set the status flag after performing the calibrating algorithm.

14. The device of claim 13, wherein the means for performing the calibrating algorithm is implemented to read the status flag before performing the calibrating algorithm and check whether the status flag is set and to perform the calibrating algorithm if the status flag is set.

15. The device of claim 12, wherein the means for performing the calibrating algorithm is implemented to check whether an enabling event has occurred and to start performing the calibrating algorithm if an enabling event has occurred.

16. A method of calibrating a circuit module for data communication with a circuit controller, the method comprising:
providing a circuit module comprising first and second circuit units and an interface device, the interface device comprising an interface calibrating unit, a first interface for a connection to the circuit controller, a second interface connected to the first circuit unit and coupled to the interface calibrating unit, and a third interface connected to the second circuit unit and coupled to the interface calibrating unit;
performing a calibrating algorithm in the interface calibrating unit to generate calibrating parameters for the second and third interfaces; and
storing the calibrating parameters generated in a non-volatile manner.

17. The method of claim 16, further comprising setting a status flag in a non-volatile manner after performing the calibrating algorithm.

18. The method of claim 17, further comprising checking the status flag before performing the calibrating algorithm, the calibrating algorithm being performed if the status flag is not set.

19. The method of claim 16, further comprising checking whether an enabling event has occurred, the performing the calibrating algorithm being performed if the enabling event has occurred.

20. The method of claim 16, wherein performing the calibrating algorithm takes place before connecting the circuit system to the controller.

21. A non-transitory computer readable medium storing a computer program comprising a program code for executing a method of calibrating a circuit module for data communication with a circuit controller when the computer program runs on a computer, the circuit module comprising an interface calibrating unit, a first circuit unit, a second circuit unit and an interface device, the interface device comprising a first interface for a connection to the controller, a second interface connected to the first circuit unit, and a third interface connected to the second circuit unit, the interface calibrating unit coupled to the second and third interfaces, the method comprising:
performing a calibrating algorithm in the interface calibrating unit to generate calibrating parameters for the second and third interfaces; and
storing the calibrating parameters generated in a non-volatile manner.

* * * * *